United States Patent Office 3,749,589
Patented July 31, 1973

3,749,589
COMPOSITION AND METHOD FOR SELECTIVELY MODIFYING THE PERMEABILITY OF SUBTERRANEAN FORMATIONS
Derry D. Sparlin and Mack W. Hunt, Ponca City, Okla., assignors to Continental Oil Company, Ponca City, Okla.
No Drawing. Filed June 1, 1971, Ser. No. 148,914
Int. Cl. C08h 15/02; C09k 3/00
U.S. Cl. 106—123          15 Claims

ABSTRACT OF THE DISCLOSURE

A composition comprising metal alkoxides and metal dispersions in organic dispersing agents, optionally diluted with organic solvents, for use in modifying the permeability of subterranean formations and a method for selectively modifying the permeability of subterranean formations.

BACKGROUND OF THE INVENTION

Field of the invention

This invention relates to a composition and method for selectively modifying the permeablitiy of subterranean formations. This invention also relates to a composition and method for controlling the flow of fluids from and into subterranean formations. This invention also relates to a method for stopping flow of fluids in subterranean formations. This invention also relates to a composition and method for selectively stopping the flow of some fluids in a subterranean formation while not materially decreasing the flow of other fluids present in the same or adjacent formations.

DESCRIPTION OF THE PRIOR ART

In the production of oil from subterranean formations it is often found that water is produced with the hydrocarbons from the formation since oftentimes water and oil bearing formations are apparently in such close proximity that flow from both contribute to the overall fluid yield of the well. This situation results in difficulties in production and separation of the produced fluids.

In waterflooding for secondary recovery of hydrocarbons water flow into subterranean formations is of concern. In these instances it is desirable to restrict the water produced from some wells wherein the water production is found to be excessive and oftentimes problems also arise in formations where water is injected in that one particular strata or portion of the formation will take the largest portion of the water leaving substantial parts of the formation untreated by the injected water. It is desirable to be able to modify the water outflow from injection wells so that relatively uniform distribution to all parts of the formation is achieved.

Thus it is desirable to be able to shut off or regulate the flow of water into and from subterranean formations. This problem is complex and the best means will often depend upon permeability, porosity, saturation, and unusual characteristics such as fractures and communication within the formation. It is rare that enough information is available to fully describe the water zone. Therefore the most practical solution to this problem would be one which would not require complete identification or isolation of the zone.

Several methods have been used heretofore to achieve water shutoff, the most common being cement squeeze. Several different kinds of cements are available and cement squeezing is used primarily where the water zones can be readily located and isolated. However, unless fractures are being squeezed cements do not penetrate into the natural formation porosity thus the water can bypass the cement under certain conditions. Cements will not bond well to the mud coated surfaces found in some formations and it is almost impossible to remove the cement once it has been placed.

Plastics have also been used for shutting off water production. The main advantages appear to be that they can penetrate even low permeability, low porosity formations. Once they have set they become strong, and they will bond to almost any surface. Some limitations are that they are prone to contamination by a variety of things, including water, before they set; they are difficult to remove after they have set; they will shut off both the water and hydrocarbon zones and they are expensive.

Sodium silicate, silica gel and silicic acid systems are essentially the same type process. They have been used successfully for many years and are normally pumped into the formation as liquids and allowed to gel or harden. Their biggest advantage is low cost. A major disadvantage is that the silicate systems remain soluble in water even after they are fully set. Thus, their effectiveness relies on completely stopping the flow of water since if some water continues to flow the silicate material will be gradually washed out. Some improvement has been achieved in the silicate and plastic systems by adding solids to the material. The solids help fill voids, fractures, vugs, and the like. The difficulty is in using solids either too large to penetrate the formation or in too high a concentration, either of which results in plastering the formation surface thus preventing all of the shut-off materials from going into the formation. The fines also act as a diverting agent which may cause more plastic or silicate to go into zones where it isn't wanted if the zones are not well isolated.

U.S. Pat. 2,782,857, issued Dec. 10, 1953 to Clarke, describes a process for selectively cementing off water producing zones while not materially affecting adjacent oil producing zones. This method uses a hydrophobic liquid slurry or cement which ideally sets up in water producing formations. A disadvantage is that the water zone must be well located and the slurry material applied accurately to prevent leakage of the cement slurry into the oil producing formations. Further disadvantages are that since the oil-bearing formation normally contains some water the cement will also set up in the oil-bearing formation thus restricting the oil flow, the cement also contains solids which will prevent it from penetrating into the pore spaces of the formation and the like.

U.S. Pat. 2,779,735 issued Apr. 18, 1956 to Brown, describes a method for sealing a porous subsurface by use of small particles in a fracturing fluid. It is obvious from the method that it is not selective and no differentiation between oil bearing and water bearing formations is achieved in the application of the fracturing fluid bearing the small particles.

U.S. Pat. 3,316,965 issued May 2, 1967 to Watanabe, describes the use of blends of hydrocarbons and polymers to seal porous subterranean surfaces. The use of inorganic salts to aid in mixing the hydrocarbon polymers is disclosed. This method suffers the same disadvantages as that described above.

U.S. Pat. 3,285,339 issued Nov. 15, 1966 to Walther describes a method for consolidating unconsolidated formations by use of a hardenable resin. The disadvantage here is again that the consolidation is not selective and formations contacted will be consolidated and plugged indiscriminately.

Accordingly much effort has been devoted in recent years to the development of a permeability modifying material which will penetrate into low-permeability, low porosity formations with any type or degree of fluid saturation, be capable of filling large voids and fractures and which will thereafter be inert to the formation environment. A desirable material should be cheap enough to be used in large quantities to cover long intervals, fill large voids and penetrate several feet radially from the wellbore. It should have the characteristics of easy placement at any depth, require short time for reaction and not require a multitude of treating steps. It should be easily removable in case of improper placement. A desirable characteristic of such a permeability modifying material is that the material not react to restrict flow in the presence of hydrocarbons so that it can be injected indiscriminately into a well without fear of shutting off oil producing zones.

OBJECTS OF THE INVENTION

An object of this invention is a composition and method for selectively modifying the permeability of subterranean formations. A further objective of this invention is a composition and method for selectively modifying the permeability of subterranean formations without specifically defining the formation parameters or the location of a particular formation. A further objective of this invention is to provide a method for selectively modifying the permeability of subterranean formations without the necessity for complex steps. A further objective of this invention is to provide a composition for selectively modifying the permeability of subterranean formations in such a manner that the modifying material may be easily removed if desired.

SUMMARY OF THE INVENTION

It has now been found that the objectives of the present invention are attained by injecting a composition comprising a metal alkoxide having the general formula:

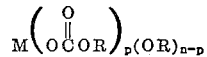

where M is a metal selected from Groups I-B, II-A, II-B, III-A, III-B, IV-A, IV-B, V-A, V-B, VI-B, VII-B and VIII-B as shown in the periodic table of the elements at page 448-449 in the Handbook of Chemistry and Physics, 40th edition, 1959, published by the Chemical Rubber Publishing Co., n is equal to the valence of M, p varies from o to n, R is selected from the group consisting of hydrocarbons containing from 1 to 20 carbon atoms, ether alcohols containing from 1 to 15 carbon atoms and alcohols containing from 1 to 20 carbon atoms, said metal alkoxide constituting 1 to 75 weight percent of the composition, and a metal dispersion wherein metallic compounds selected from the group consisting of water-insoluble oxides, hydroxides or carbonates of metals selected from Groups I-B, II-A, II-B, III-A, III-B, IV-A, IV-B, V-A, V-B, VI-B, VII-B, and VIII-B as shown in the periodic table of the elements at pages 448-449 in the Handbook of Chemistry and Physics, 40th edition, 1959, published by the Chemical Rubber Publishing Co., are dispersed in a dispersing agent selected from the group consisting of fatty acids, tall oil acids, sulfonates and phenates, said metal dispersions constituting from 99 to 25 weight percent of the composition to modify the permeability of subterranean formations.

PREFERRED EMBODIMENTS

Materials useful in the practice of the present invention are metal alkoxides and metal dispersions of the metals shown in Groups I-B, II-A, II-B, III-A, III-B, IV-A, IV-B, V-A, V-B, VI-B, VII-B and VIII-B as shown in the periodic table of the elements at pages 448-449 in the Handbook of Chemistry and Physics, 40th edition, 1959, published by the Chemical Rubber Publishing Co. Examples of some metals useful in the practice of the present invention are magnesium, calcium, lanthanum, titanium, vanadium, chromium, manganese, iron, copper, cadmium, aluminum, tin, bismuth, barium, strontium, zinc, lead, nickel and cobalt.

Preferred metal alkoxides are the alkoxides of calcium, magnesium, barium, strontium, zinc, aluminum, lead, copper, nickel and cobalt and preferred metal dispersions are dispersions of the water-insoluble metal oxides, hydroxides and carbonates of the metals listed, it being understood that water-insoluble is used in a general rather than absolute sense.

Preferred metal alkoxides are the calcium, magnesium, barium and zinc alkoxides of the mono carbonate of the mono methyl ether of diethylene glycol and the aluminum trialkoxide of the mono methyl ether of diethylene ether and preferred metal dispersions are the dispersions of calcium, magnesium and barium. The preparation of such metal dispersions is well-known in the art and is shown in U.S. Pat. 3,150,088, issued Sept. 22, 1964 to Hunt, U.S. Pat. 3,150,089 issued Sept. 22, 1964 to Hunt, and U.S. Pat. 3,277,002 issued Oct. 4, 1966 to Hunt. The metal alkoxide content of the composition may vary from 1 to 75 weight percent but is preferably from 4 to 25 weight percent. The composition may be diluted with an inert organic solvent such as, but not limited to, paraffinic, naphthenic and aromatic hydrocarbon oils, alcohols, glycols, ethers, vegetable oils, lard oils, sperm oil, synthetic oils such as polymers of propylene, polyoxyalkylenes, polyoxypropylene and synthetic esters such as those derived from adipic and azelaic acids. The solvent may be present in amounts up to 90.0 percent by weight. A preferred range is 50-75 weight percent solvent.

The choice of whether the composition should be used full strength or diluted is fixed by the desired objective of the user. In other words at full strength total shut-off of water-bearing formations is achieved. With dilution partial shut-offs can be accomplished.

The degree of shut-off is also controlled to a degree by the pre-flush and over-flush of the material into the formation, i.e. a pre-flush which removes a portion of the formation water will result in less plugging. An overflush which dilutes the composition will also result in less reestriction of the formation.

Metal alkoxides alone may be used as the water shut-off material. The metal alkoxides may be used full strength or diluted with an inert organic solvent such as but not limited to paraffinic, naphthenic and aromatic hydrocarbon oils, alcohols, glycols, ethers, vegetable oils, lard oils, sperm oil, synthetic oils such as polymers of propylene, polyoxyalkylenes, polyoxypropylene and synthetic esters such as those derived from adipic and azelaic acids. Preferred solvents are paraffinic hydrocarbon oils, alcohols, glycols and ethers. The solvent may be present in an amount up to 90 weight percent of the total composition although 50-75 weight percent solvent is a more desirable mixture.

Such compositions are more reactive with water to form the gel structure shut-off material than the combinations including the metal dispersions as an ingredient. Rapid shut-off is achieved on contact with formation water. The resultant material is not as permanent as that achieved by use of the metal dispersions alone or in combination since less formation penetration is achieved. Thus the alkoxide composition alone results in a more temporary shut-off agent. A further advantage is that pressure and rate variations during injection will be rapid and the treatment can be easily monitored.

Metal dispersions may also be used alone or in combination with inert organic diluents such as but not limited to paraffinic, naphthenic and aromatic hydrocarbon oils, alcohols, glycols, ethers, vegetable oils, lard oils, sperm oil, synthetic oils such as polymers of propylene, polyoxyalkylenes, polyoxypropylene and synthetic esters such as those derived from adipic and azelaic acids. Preferred solvents are paraffins, naphthenic and aromatic hydrocarbon oils. Said diluents may be present in an amount up to 90 weight percent of the composition although 50-75 weight percent solvent is a more desirable formulation.

Metal dispersions are very soluble in hydrocarbon oils thus high concentrations of the metal dispersion can be used to form stable, permanent, plugging materials. The metal dispersions are less reactive than the metal alkoxides described above and require curing time to be fully effective. They are also more susceptible to an oil overflush and are therefore more readily adapted to partial plugging treatments.

A particularly preferred composition is a mixture containing 10 to 40 weight percent diesel oil, 5 to 35 weight percent 2-butoxyethanol, 15 to 55 weight percent metal dispersion and 10 to 40 weight percent metal alkoxide.

This composition offers advantages over either component alone. It has a lower viscosity and pumps well even when low-permeability formations are treated; the mixture gives a shut-off material with quick shut-off properties and long term stability and the composition mixture is stable and can be stored for long periods of time at normal temperatures (10° F. to 100° F.) with no phase separation etc.

In the practice of the present invention the material may simply be pumped into the well cavity and forced by pressure and the like into the surrounding formation. The composition material will upon contact with water react to form a plugging material which will stop the flow of water in the water-bearing formations while not materially affecting the flow of oil from the oil-bearing formations. A particular advantage of the composition of the present invention is that upon contact with water it reacts to form a solid or semi-solid gelatinous material thus plugging the water-bearing formations. No such reaction occurs upon contact with oil thus it is possbile to plug off water-producing formations in presence of oil-bearing formations. It is not necessary to selectively inject the composition material into a given strata to avoid plugging adjacent oil-bearing formations.

A second method for utilizing the composition of the present invention involves selectively injecting the composition material into a desired formation. It is expected that this method would be most commonly used in secondary recovery operations wherein water is being injected into several formations through a common well and one or more of said formations is accepting considerably more than its proportionate amount of water. In such applications it will be found desirable to inject the composition directly into the formations accepting disproportionately large quantities of water to either partially or totally seal off said formations.

It is to be noted that the compositions of the present invention are readily removable if injected into a formation which is to be reused at a later date, the wrong formation by mistake and the like by simply acidizing such formation. Acids such as, but not limited to, hydrochloric acid, sulfuric acid, hydrofluoric acid, acetic acid, formic acid and the like are suitable for use in removing the compositions of the present invention. A preferred acid is hydrochloric acid.

It is to be noted that the plugging material formed is also slightly oil-soluble so that when it is formed by mistake in an oil-bearing formation the oil will gradually dissolve the material, thus restoring the original formation permeability.

In summary the method and composition of the present invention are shown to possess utility for modifying or stopping flow into or from subterranean formations without the necessity for identifying and specifically locating each formation to be modified. Variations of the methods discussed above may be employed within the spirit of the present invention. Such variations may appear obvious to those skilled in the art based on the above discussion and following examples.

EXAMPLES

To simplify the following examples and discussion certain terms will be defined at this point in order that more common terms may be used in the following examples.

Calcium alkoxide mono-carbonate of the monomethyl ether of diethylene glycol will be referred to as calcium alkoxide.

The term diesel oil is used to refer to number 1 diesel fuel although the invention is not limited to such.

Zinc alkoxide mono carbonate of the mono-methyl ether of diethylene glycol will be referred to as zinc alkoxide.

Magnesium alkoxide mono carbonate of the mono methyl ether of diethylene glycol will be referred to as magnesium alkoxide.

Aluminum trialkoxide of the mono methyl ether of diethylene glycol will be referred to as aluminum alkoxide.

Metal dispersions comprising a dispersing agent selected from the group consisting of fatty acids, tall oil acids, sulfonates and phenates, a metal compound selected from the group comprising water-insoluble metal carbonates, oxides and hydroxides and inert organic solvents as listed hereinbefore will be referred to as metal dispersions, e.g. calcium dispersions.

Examples of such compositions are:

|  | Weight percent |
|---|---|
| Dispersing agent | 15–45 |
| Metal compound | 15–40 |
| Inert organic solvent | 20–50 |

Preferred compositions are:

| Dispersing agent | 25–35 |
|---|---|
| Metal compound | 20–30 |
| Inert organic solvent | 35–45 |

It is understood that the above examples are supplied for illustrative purposes and the scope of the present invention is not limited to such examples.

It was discovered that certain metal dispersions in oil and the metal alkoxides described above react upon contact with water to form a gelatinous material suitable for plugging or modifying subterranean formations. The following examples show tests performed with these materials illustrating this property. The tests were performed in a Hassler sleeve apparatus which holds ⅞" diameter cores 2" to 4" long and uses air pressure to push fluids through the cores. The tests utilized Oklahoma No. 1 sand packs unless otherwise stated. This sand is a clean, fine-grained quartz sand with permeability in the order of 5 to 10 darcies. The procedure was to pack the sand in tap water and then flush it to approximately interstitial water with diesel oil. Some tests omitted this diesel oil flushing step to test the plugging effect on 100% water-saturated sand. The treating material was then passed into and through the cores unless total-shut off was achieved before the charge had passed through. The retained permeability was then checked by reflowing water through the same core. Tests on various materials are shown in Table I.

TABLE I

| Test | Preflush Type | Volume (ml.) | Treatment material Type | Volume (ml.) | Percent retained permeability |
|---|---|---|---|---|---|
| A | None | None | Calcium alkoxide | 100 | 1.5 |
| B | D.O.[1] | 360 | Magnesium alkoxide | 100 | 0 |
| C | D.O.[1] | 360 | Calcium dispersion | 100 | 0 |
| D | D.O.[1] | 140 | Zinc alkoxide | 100 | 23 |
| E | D.O.[1] | 140 | Aluminum alkoxide | 100 | 0 |

[1] D.O.=Diesel oil.

As shown all materials tested substantially reduced the permeability and in some cases flow was stopped completely.

Further tests were performed using the same apparatus and procedure to determine the effectiveness of the mixtures of metal alkoxides and metal dispersions. Some compositions tested are shown in Table II.

TABLE II

| Test | Preflush Type | Preflush Volume (ml.) | Treatment material Type | Treatment material Volume (ml.) | Percent retained permeability |
|---|---|---|---|---|---|
| A | D.O.[1] | 140 | [2] | 100 | 0 |
| B | None | None | [3] | 50 | 2 |
| C | do | None | [4] | 50 | 1 |

[1] Diesel oil.
[2] A blend of 33⅓% calcium alkoxide, 33⅓% calcium dispersion and 33⅓% isopropyl alcohol.
[3] A blend of 37.3% calcium dispersion, 19.5% calcium alkoxide, 24.8% butyl Cellosolve (registered trademark of Union Carbide and Carbon Corp. for 2-ethoxyethanol) and 18.4% diesel oil.
[4] A blend of 28.7% calcium dispersion, 22% calcium alkoxide, 28% butyl Cellosolve and 21.3% diesel oil.

The compositions shown all proved to be effective in reducing permeability.

Further tests were run utilizing the same procedure to investigate the effect of curing time. The only modifications in the procedure described in the examples above are that the treated packs were removed and cured in a water bath at 160° F. for the desired time, then remounted in the apparatus and their permeabilities checked and cores from a Lansing-Kansas City formation were used.

TABLE III

| Test | Preflush Type | Preflush Volume (ml.) | Treatment Type | Treatment Volume (ml.) | Curing time (days at 160° F.) | Percent retained permeability |
|---|---|---|---|---|---|---|
| A | [1] | 15 | [2] | 25 | 1 | 0 |
|   | [1] | 15 | [2] | 25 | 2 | 0 |
|   | [1] | 15 | [2] | 25 | 3 | 0 |
|   | [1] | 15 | [2] | 25 | 7 | 0.3 |
| B | [1] | 15 | [2] | 25 | 1 | 0 |
|   | [1] | 15 | [2] | 25 | 2 | 0 |
|   | [1] | 15 | [2] | 25 | 3 | 0 |
|   | [1] | 15 | [2] | 25 | 7 | 0 |
| C | [1] | 15 | [2] | 25 | 1 | 0 |
|   | [1] | 15 | [2] | 25 | 3 | 0 |
|   | [1] | 15 | [2] | 25 | 21 | 0 |
| D | [1] | 15 | [2] | 25 | 1 | 0 |
|   | [1] | 15 | [2] | 25 | 3 | 0 |
|   | [1] | 15 | [2] | 25 | 21 | 0 |

[1] A blend of 20% butyl Cellosolve and 80% diesel oil.
[2] A blend of 34.3% calcium dispersion, 21.9% calcium alkoxide, 18.5% butyl Cellosolve and 25.3% diesel oil.

It will be noted that curing time does not significantly change the plugging materials ability to reduce permeability.

Further tests were performed to determine the effect of dilution on the performance of the compositions. The dilutions were as shown on Table IV.

TABLE IV

| Test | Preflush Type | Preflush Volume (ml.) | Treatment Type | Treatment Volume (ml.) | Percent retained permeability |
|---|---|---|---|---|---|
| A | None | None | 13% calcium dispersion.[1] | 50 | 94 |
| B | do | None | 31% calcium dispersion.[1] | 50 | 84 |
| C | do | None | 57.5% calcium dispersion.[1] | 50 | 33 |
| D | D.O.[2] | 170 | 31% calcium dispersion.[1] | 50 | 209 |
| E | None | None | 16.9% calcium alkoxide.[3] | 50 | 68 |
| F | D.O.[2] | 170 | do.[3] | 50 | 61 |
| G | None | None | 33.1% calcium alkoxide.[4] | 50 | 34 |
| H | do | None | 40% calcium alkoxide.[5] | 50 | 31 |
| I | do | None | 33.1% calcium alkoxide.[6] | 100 | 51 |
| J | D.O.[2] | 360 | 52.9% magnesium alkoxide.[7] | 15 | 0 |
| K | D.O.[2] | 360 | 27.2% magnesium alkoxide.[7] | 20 | 0 |

[1] Calcium dispersion diluted with diesel oil.
[2] Diesel oil.
[3] A blend of 16.9% calcium alkoxide, 50% isopropyl alcohol and 33.1% diesel oil.
[4] A blend of 33.1% calcium alkoxide, 35.6% butyl Cellosolve and 31.3% diesel oil.
[5] A blend of 40% calcium alkoxide, 29.1% hexyl alcohol and 30.9% diesel oil.
[6] A blend of 33.1% calcium alkoxide, 35.6% butyl alcohol and 31.3% diesel oil.
[7] Magnesium alkoxide diluted with methyl Cellosolve.

It is shown that less reduction in permeability is realized when dilute solutions are used thus the degree of flow restriction may be controlled when total shutoff is not desirable.

Further tests were performed substituting flagstone samples for the sand cores. Comparisons of data taken in these tests with that from earlier tests is shown in Table V.

TABLE V

| Test | Preflush treatment Type | Preflush treatment Volume (ml.) | Treatment Type | Treatment Volume [1] (ml.) | Percent retained permeability Okla. No. 1 sand | Percent retained permeability Flagstone |
|---|---|---|---|---|---|---|
| A | None | None | [2] | 50 | 7 / 2.2 | 0 / 0.7 |
| B | [1] | 10 | [3] | 20 | 0 / 3.2 | 1.2 / 0 |

[1] 20% butyl Cellosolve in diesel oil.
[2] 57.5% calcium dispersion in diesel oil.
[3] A blend of 34.3% calcium dispersion, 21.9% calcium alkoxide, 18.5% butyl Cellosolve and 25.3% diesel oil.

Little difference in the flagstone and sand cores was noted.

A field test was performed to determine the effectiveness of our compositions in an actual field test. The method and results were as follows.

A field test was performed in a well completed in the Lansing-Kansas City carbonate formation in Kansas. The test well was a water injection well in a water flood field. To improve the injectivity profile of the well three zones were restricted by means of the present invention to allow more water to be injected into three other zones that had previously been receiving a deficient volume of water.

The zones of interest were the A zone (3651–52'), B zone (3682–83'), C zone (3692–93'), D zone (3807–08'), E zone (3826–27') and the F zone (3847–48') each perforated with four shots per foot in 5½" casing. The casing was filled with sand to just below the C zone and a packer was set between the A and B zones thus isolating the B and C zones. A blend of water-shutoff material was prepared at the surface consisting of 34.4% calcium dispersion, 21.9% calcium alkoxide, 18.57% butyl Cellosolve and 25.3% diesel oil by weight. Three bbls. of diesel oil were pumped into the formation followed by 2 bbls. of a solution of 80% diesel oil and 20% butyl Cellosolve by volume, 2 bbls. of water-shutoff blend, 4 bbls. of diesel oil and displaced with water. While injecting the material at 17 gallons per minute the surface pressure rose from 100 p.s.i. to 450 p.s.i. which indicated that plugging of the formation was occurring.

Injection tests in the B and C zones prior to the treatment indicated that these zones would accept water at 0.344 bbl./day/p.s.i. Injection tests after the treatment showed injection into the B zone at 0.0525 bbl./day/p.s.i. and the C zone completely shut off.

The sand was washed out of the casing to just below the D zone and the packer set just above the D zone. This zone was known to be fractured and had been taking 100% of the water that had been injected into the lower 3 zones. The D zone was packed with Oklahoma No. 1 sand. One half bbl. of diesel oil was injected into the zone followed by 6 bbls. of the previously described water-shutoff blend, another ½ bbl. of diesel oil and displaced with water.

A previous injection test on the D zone showed it accepted water at 0.471 bbl./day/p.s.i. After the treatment injection was established at 0.168 bbl./day/p.s.i.

This well was put back on injection with a packer set between the C and D zones. Injection into the upper zones was obtained down the annulus and into the lower zones down the tubing. Prior to the water-shutoff job injection was maintained at approximately 300 BPD without any surface pressure into both upper and lower zones. After the treatment an injection rate of 232 BPD into the upper zones required 220 p.s.i. surface pressure and 298 BPD into the lower zones required 270 p.s.i. surface pressure.

Further tests were performed to investigate methods for removing the composition materials deposited in the pores of formations and to illustrate the difference in plugging in oil-wet formations as opposed to water-wet formations.

TABLE VI

| Test* | Preflush Type | Preflush Volume (ml.) | Treatment materials Type | Treatment materials Volume (ml.) | Percent retained permeability |
|---|---|---|---|---|---|
| A | (¹) | 10 | (²) | 10 | 22 |
|   |   |   | 5% HCl | 50 | 375 |
| B | (¹) | 10 | (²) | 20 | 0 |
|   |   |   | 15% HCl | 50 | 1,126 |
| C | (³) | 5 | (²) | 20 | 1.05 |
| D | (³) | 5 | (²) | 20 | 3.58 |
| E | (³) | 20 | (²) | 20 | 12.76 |
| F | (³) | 20 | (²) | 20 | 40.45 |
| G | None | | (⁴) | 50 | 67 |
| H | (³) | 170 | (⁴) | 50 | 122 |

¹ 20% butyl Cellosolve in diesel oil.
² A blend of 34.3% calcium dispersion, 21.9% calcium alkoxide.
³ 18.5% butyl Cellosolve and 35.3% diesel oil.
⁴ 25% calcium dispersion in diesel oil.
*Tests A and B used carbonate cores; C,D, E and F used sand cores; G and H used flagstone cores.

Tests C, D and G used water-wet sand cores while tests E, F and H used oil-saturated sand cores. It is shown that permeability is reduced much more significantly in the water-wet sand cores. The cores from tests A and B were treated with acid as shown. The results show that the material is easily removed even with dilute acid. The increased permeability is probably a result of acid reaction with the carbonate cores.

As has been shown above the materials of the present invention are valuable for water shutoff and for modification of water flows in subterranean formations without materially affecting the oil flow from adjacent formations. The modifications are relatively permanent, if desired, yet easily removed if necessary by acid treatments and the like. By the methods of the invention water-bearing formations can be plugged off or the flow modified by simply injecting the material into the well without the necessity for finding the exact location of the water-bearing formation or the particular parameters of the formations such as porosity, permeability and the like.

Having thus described the invention we claim:
1. A composition consisting essentially of:
  (a) a metal alkoxide having the general formula:

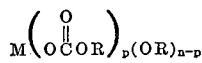

where M is a metal selected from the group consisting of magnesium, calcium, lanthanum, titanium, vanadium, chromium, manganese, iron, copper, cadmium, aluminum, tin, bismuth, barium, strontinum, zinc, lead, nickel, and cobalt; $n$ is equal to the valence of M; $p$ varies from 0 to $n$; R is selected from the group consisting of hydrocarbons containing from 1 to 20 carbon atoms, ether alcohols containing from 1 to 15 carbon atoms, and alcohols containing from 1 to 20 carbon atoms, said metal alkoxide constituting 1 to 75 weight percent of the composition and
  (b) a metal dispersion wherein metallic compounds selected from the group consisting of water-insoluble oxides, hydroxides, and carbonates of metals selected from the group consisting of magnesium, calcium, lanthanum, titanium, vanadium, chromium, manganese, iron, copper, cadmium, aluminum, tin, bismuth, barium, strontium, zinc, lead, nickel, and cobalt are dispersed in a dispersing agent selected from the group consisting of fatty acids containing from about 8 to about 50 carbon atoms, tall oil acids containing from about 8 to about 50 carbon atoms, sulfonates containing from about 14 to about 50 carbon atoms, and phenates containing from about 12 to about 50 carbon atoms, said metal dispersion constituting from about 99 to 25 weight percent of the composition.

2. The composition of claim 1 wherein an inert organic solvent is present in an amount up to 90 weight percent.

3. The composition of claim 1 wherein said sulfonates are selected from the group consisting of alkyl sulfonates, alkaryl sulfonates and aryl sulfonates containing from 14 to 50 carbon atoms.

4. The composition of claim 1 wherein said phenates contain from 12 to 50 carbon atoms.

5. The composition of claim 1 wherein said metal alkoxides contain metals selected from the group consisting of calcium, magnesium, barium, strontium, zinc, aluminum, lead, copper, nickel and cobalt.

6. The composition of claim 1 wherein said metal dispersions contain metallic compounds selected from the group consisting of water-insoluble oxides, hydroxides and carbonates of metals selected from the group consisting of calcium, barium and magnesium.

7. The composition of claim 1 wherein said R has a general formula selected from the group comprising;

—$CH_3$, —$C_2H_5$—$C_3H_7$, —$C_4H_9$, —$CH_2CH_2OCH_3$,

—$CH_2CH_2OC_2H_5$,

—$CH_2CH_2OC_3H_7$ and —$CH_2CH_2OC_4H_9$

8. The composition of claim 1 wherein said metallic compound contained in the metal dispersion is selected from the group consisting of calcium carbonate, magnesium carbonate and barium carbonate.

9. The composition of claim 1 wherein calcium sulfonate containing from 14 to about 50 carbon atoms is a dispersing agent.

10. The composition of claim 1 wherein said metal alkoxide contains a metal selected from the group consisting of calcium, magnesium and barium and said metal dispersion contains metallic compounds selected from the group consisting of calcium carbonate, barium carbonate and magnesium carbonate.

11. The composition of claim 2 wherein said metal alkoxide contains a metal selected from the group consisting of calcium, magnesium and barium and said metal dispersion contains metallic compounds selected from the group consisting of calcium carbonate, barium carbonate and magnesium carbonate and said inert organic solvent is a mixture of diesel oil and butyl Cellosolve.

12. The composition of claim 2 wherein said components are present in the proportions:

| | Weight percent |
|---|---|
| (a) Diesel oil | 10–40 |
| (b) Butyl Cellosolve | 5–35 |
| (c) Metal dispersion | 15–55 |
| (d) Metal alkoxide | 10–40 |

13. The composition of claim 2 wherein said metal alkoxide is calcium alkoxide, said metal dispersion is a dispersion of calcium carbonate in calcium sulfonate, containing from 14 to about 50 carbon atoms and oil, said organic solvents are diesel oil and butyl Cellosolve and said components are present in the proportions:

| | Weight percent |
|---|---|
| (a) Calcium alkoxide | 20–24 |
| (b) Calcium carbonate, dispersion | 31–37 |
| (c) Diesel oil | 20–30 |
| (d) Butyl Cellosolve | 15–20 |

14. The composition of claim 2 wherein said metal alkoxide is magnesium alkoxide, said metal dispersion is a dispersion of calcium carbonate in calcium sulfonate, containing from 14 to about 50 carbon atoms and oil, said organic solvents are diesel oil and butyl Cellosolve and said components are present in the proportions:

|  | Weight percent |
|---|---|
| (a) Magnesium alkoxide | 20–24 |
| (b) Calcium carbonate dispersion | 31–37 |
| (c) Diesel oil | 20–30 |
| (d) Butyl Cellosolve | 15–20 |

15. The composition of claim 2 wherein said metal alkoxide is barium alkoxide, said metal dispersion is a dispersion of calcium carbonate in calcium sulfonate, containing from 14 to about 50 carbon atoms and oil, said organic solvents are diesel oil and butyl Cellosolve and said components are present in the proportions:

|  | Weight percent |
|---|---|
| (a) Barium alkoxide | 20–24 |
| (b) Calcium carbonate dispersion | 31–37 |
| (c) Diesel oil | 20–30 |
| (d) Butyl Cellosolve | 15–20 |

References Cited

UNITED STATES PATENTS

| 3,660,119 | 5/1972 | Oken | 106—14 |
| 3,653,930 | 4/1972 | Law | 106—14 |

FOREIGN PATENTS

| 925,763 | 5/1963 | Great Britain | 106—14 |

THEODORE MORRIS, Primary Examiner

U.S. Cl. X.R.

106–287 SS; 252—8.55 R; 166—294